(12) United States Patent
Pai

(10) Patent No.: US 7,604,191 B2
(45) Date of Patent: Oct. 20, 2009

(54) GRINDER

(76) Inventor: Chung-Jen Pai, 1F, No. 83, Lane 26, Chung Hsiao St., Chung Ho, Taipei Hsien (TW)

( * ) Notice: Subject to any disclaimer, the term of this patent is extended or adjusted under 35 U.S.C. 154(b) by 153 days.

(21) Appl. No.: 11/812,245

(22) Filed: Jun. 15, 2007

(65) Prior Publication Data

US 2008/0185465 A1 Aug. 7, 2008

(30) Foreign Application Priority Data

Feb. 5, 2007 (TW) .............................. 96104142 A

(51) Int. Cl.
*A47J 42/00* (2006.01)
(52) U.S. Cl. .................................... 241/169.1
(58) Field of Classification Search ................. 241/168, 241/169.1
See application file for complete search history.

(56) References Cited

U.S. PATENT DOCUMENTS

| | | | | |
|---|---|---|---|---|
| 5,785,264 A * | 7/1998 | Yang | ........................ | 241/169.1 |
| 5,865,384 A * | 2/1999 | Pai | .............................. | 241/93 |
| 6,443,377 B1 * | 9/2002 | Cheng | ...................... | 241/169.1 |
| 6,929,201 B1 * | 8/2005 | Blouse et al. | ............ | 241/169.1 |
| 7,207,511 B2 * | 4/2007 | Ng | .......................... | 241/101.3 |
| 2002/0117566 A1 * | 8/2002 | Cheng | ..................... | 241/169.1 |
| 2004/0124294 A1 * | 7/2004 | Ng | .......................... | 241/169.1 |
| 2004/0182958 A1 * | 9/2004 | Herren | .................... | 241/169.1 |
| 2005/0029376 A1 * | 2/2005 | Heng et al. | .............. | 241/169.1 |
| 2005/0211806 A1 * | 9/2005 | Ng | .......................... | 241/169.1 |
| 2007/0210195 A1 * | 9/2007 | Chapman et al. | ......... | 241/169.1 |
| 2008/0093489 A1 * | 4/2008 | Hadj-Chikh et al. | ..... | 241/169.1 |
| 2009/0084878 A1 * | 4/2009 | Wang Wu | ................ | 241/169.1 |

* cited by examiner

*Primary Examiner*—Faye Francis
(74) *Attorney, Agent, or Firm*—Guice Patents PLLC

(57) ABSTRACT

A grinder comprised of a driving unit, a hollow base, a grinding device, and a container. When lifting the container to disengage an engagement portion of the container from a top engagement portion of the hollow base and to compress an elastic member against a hollow guide disk, a rotary cap is rotatable with the container relative to the hollow base to adjust the gap between the grinding base and grinding disk of the grinding device subject to the desired ground powder particle size.

18 Claims, 7 Drawing Sheets dance with the present invention.
GRINDER

BACKGROUND OF THE INVENTION

1. Field of the Invention

The present invention relates to grinders and more particularly, to such a grinder, which allows easy adjustment of the ground powder particle size.

2. Description of the Related Art

It is quite common to use powdered or grained spice such as pepper powder, curry powder, coffee beans, and etc. (herein generally referred to as spice) in the preparation of food or drinks. Powdered spice can easily solved in liquid or evenly distributed on the food.

There have been available spice grinders, which are of two types. That is, grains or pieces of spice are put into a grinder, which is manually or electrically operated to grind the grains or pieces into powder for direct sprinkling onto food or soup. These grinders are quite popular among users for the advantage of instant grinding. Taiwan Patent Nos. 367805 and 415215 (equivalent to U.S. Pat. No. 5,865,384), issued to the present inventor, discloses a similar design. According to this design, the grinder comprises a housing, a spindle, a grinding device, a particle size adjusting device, and a driving device. This design is functional, however it still has drawbacks. Before putting the material to be ground into the housing, the user must remove the driving device from the housing. This operation manner is inconvenient. Therefore, an improvement is necessary.

Further, a conventional grinder has a ground power particle size adjusting device at the top or bottom side for allowing adjustment of the desired ground powder particle size. Because the ground power particle size adjusting device is spaced from the grinding device at a distance, it is not effective to adjust the desired ground powder particle size. In the aforesaid U.S. Pat. No. 5,865,384, the ground powder particle size adjusting device is provided at the bottom center of the housing, comprising an annular base disk with a pair of wings, each wing extending from an opposite side of the base disk, the wings extending to a disk post at a center of the base disk, the disk post having a disk hole and two wing slots, a disk packing having two side wings being disposed in the disk hole, with the two side wings located in the wing slots, a screw rod of a knob being passed through the disk hole of the disk post to lock with a packing piece. When the knob is turned, the disk packing may displace upwardly and downwardly and further cause the spindle connected with the disk packing to also displace upwardly and downwardly for adjusting the clearance between the disk teeth and the grinding teeth. According to this bottom adjustment design, the annular base disk and the knob may easily be covered with the ground powder. Further, when a rotary cover is coupled to the bottom side of the housing, cleaning of the annular base disk and the knob becomes complicated.

SUMMARY OF THE INVENTION

The present invention has been accomplished under the circumstances in view. It is therefore the main object of the present invention to provide a grinder, which allows adjustment of the ground powder particle size in an easy and convenient way.

To achieve this and other objects of the present invention, the grinder comprises a driving unit, the driving unit comprising a spindle; a hollow base mounted on a top side of the driving unit, the hollow base having a grinding chamber in which the spindle suspends, a ground powder outlet in communication with the grinding chamber, at least one inner thread extending around the grinding chamber, and a top engagement portion; a grinding device, the grinding device comprising a grinding disk and a grinding base, the grinding disk being affixed to the spindle and suspending in the grinding chamber and kept spaced from the grinding base by a gap; a container mounted on a top side of the hollow base, the container comprising a bottom opening, an annular bottom coupling flange extending around the bottom opening, an engagement portion extending from the annular bottom coupling flange for engaging the top engagement portion of the hollow base to prohibit rotation of the container relative to the hollow base, a hollow guide disk mounted therein and spaced above the bottom opening, an elastic member supported between the annular bottom coupling flange and the hollow guide disk, and a rotary cap rotatably coupled to the annular bottom coupling flange and fastened to the hollow guide disk, the rotary cap having a bottom side fixedly connected to the grinding base and at least one outer thread threaded into the at least one inner thread of the hollow base. When lifting the container to disengage the engagement portion of the annular bottom coupling flange from the top engagement portion of the hollow base, the elastic member is compressed by the annular bottom coupling flange against the hollow guide disk, and the rotary cap is rotatable with the container relative to the hollow base to adjust the gap between the grinding base and the grinding disk.

DETAILED DESCRIPTION OF THE PREFERRED EMBODIMENT

Figure 1:
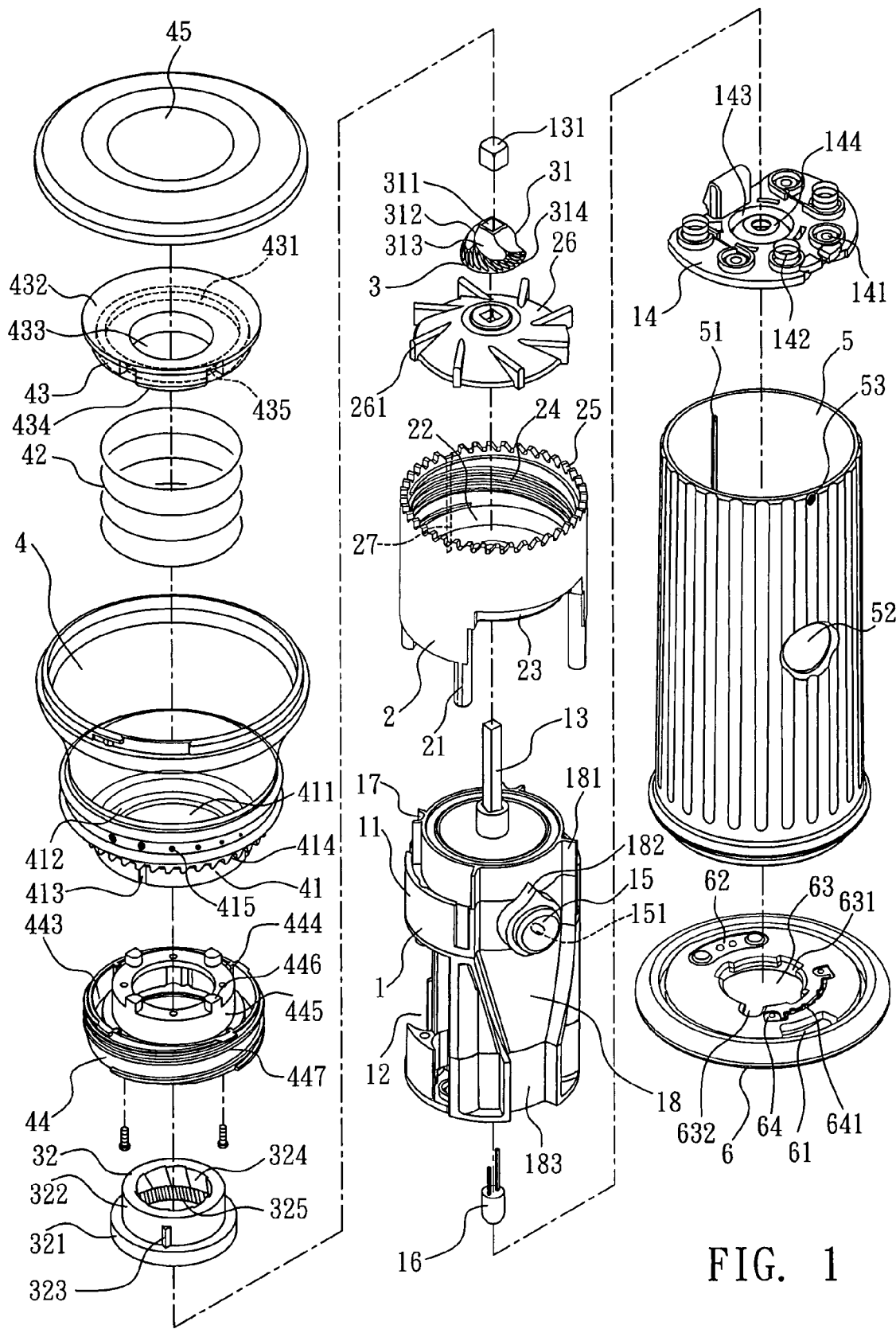
FIG. 1 is an exploded view of a grinder in accordance with the present invention.
Figure 2:
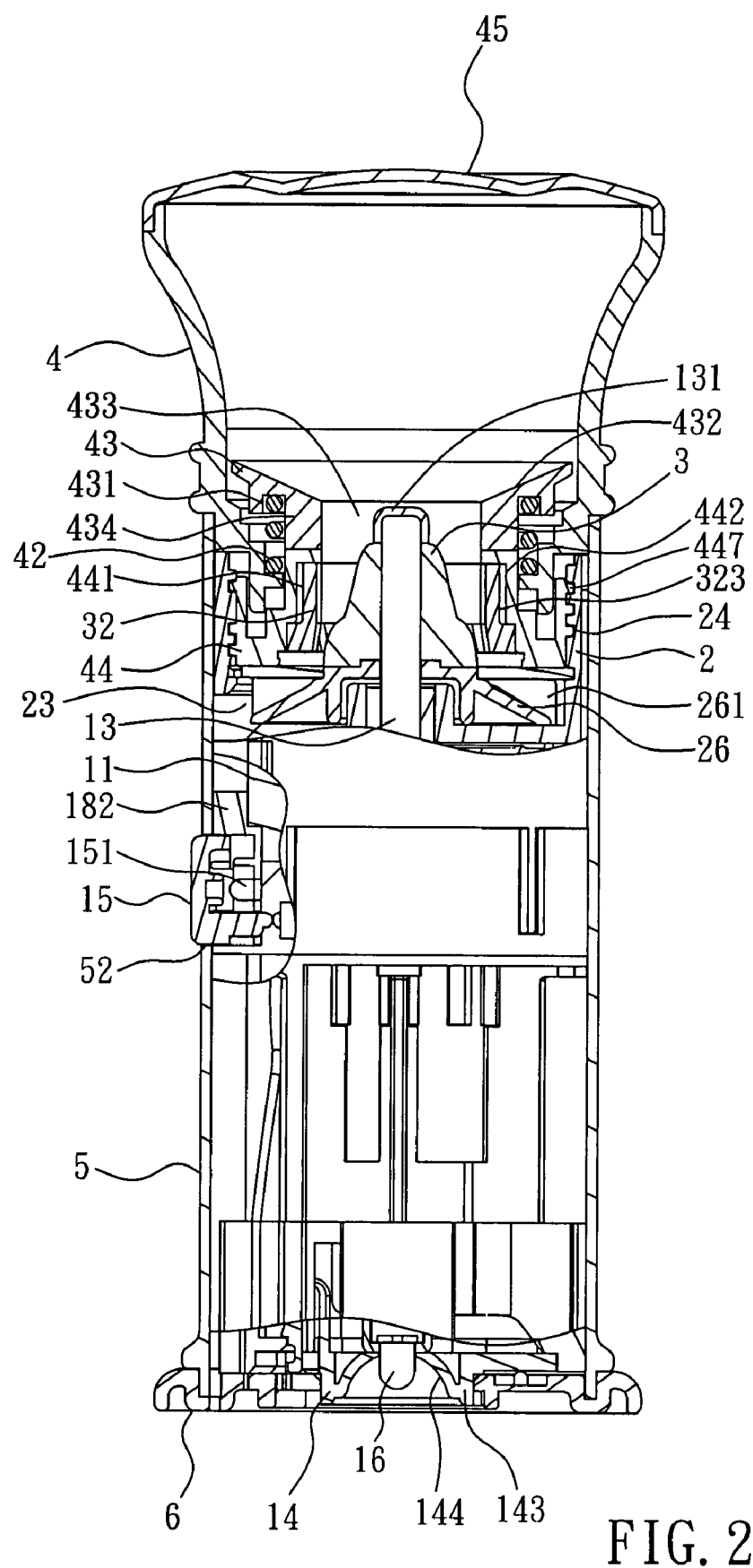
FIG. 2 is a sectional assembly view of the grinder in accordance with the present invention.
Figure 3:
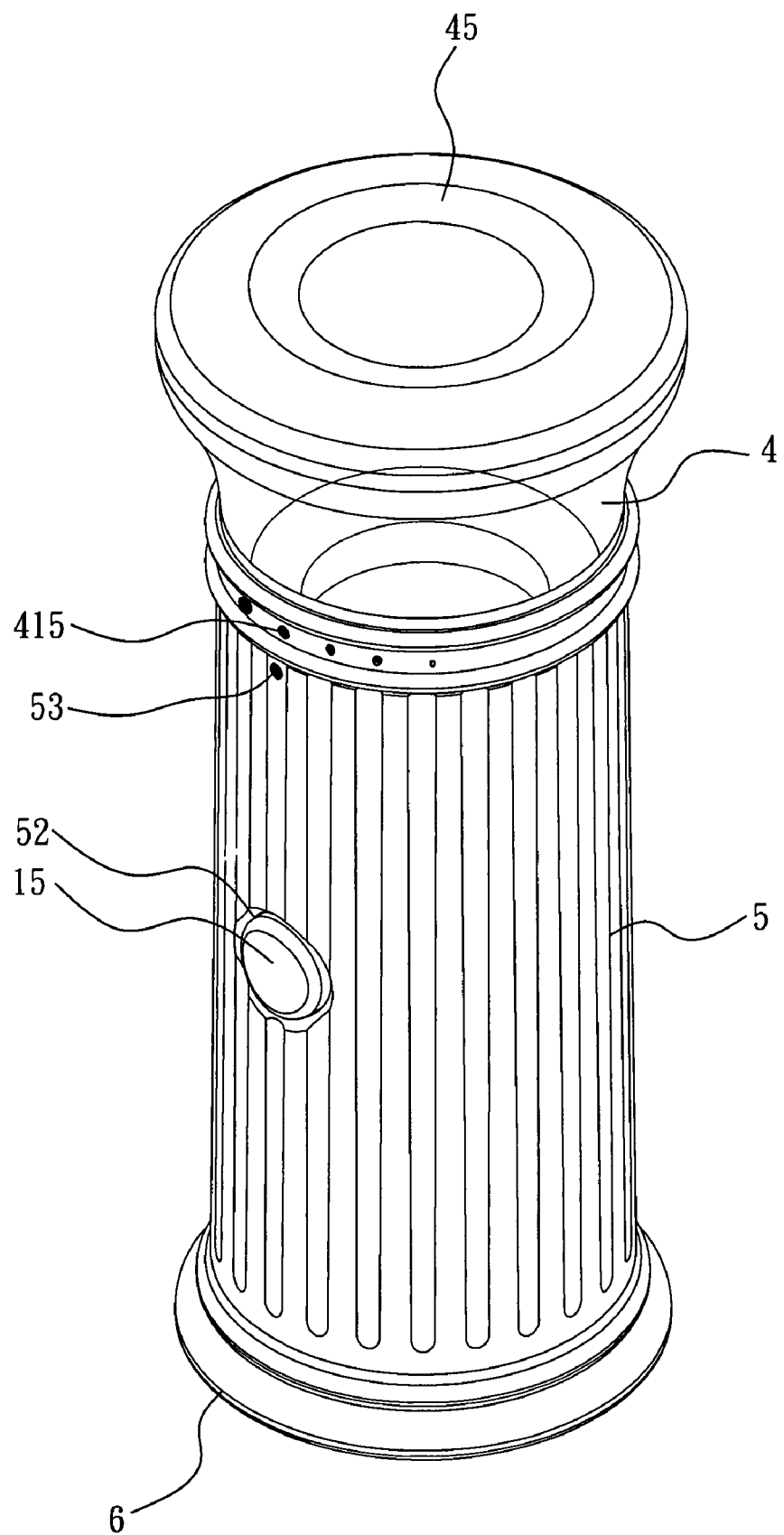
FIG. 3 is a perspective view of the grinder in accordance with the present invention.

Referring to FIGS. 1~3, a grinder in accordance with the present invention is shown comprised of a driving unit 1, a base 2, a grinding device 3, a container 4, a housing 5, and a bottom cover 6.

The driving unit 1 comprises a hollow shell 11, which has a battery chamber 12 in its bottom side, a motor (not shown) mounted inside the hollow shell 11 electrically connected to the battery cells (not shown) in the battery chamber 12, a speed reduction gear set (not shown) mounted inside the hollow shell 11 coupled to and rotatable by the motor, a spindle 13 coupled to one end, namely, the output end of the speed reduction gear set and axially extending out of the center of the top side of the hollow shell 11, a battery lid 14, which covers the bottom side of the battery chamber 12 and has a plurality of positive electrodes and negative electrodes alternatively and equiangularly arranged on its top side around the border and one positive pole contact 141 and one negative pole contact 142 exposed out of its bottom side and respectively electrically connected to one positive electrode and one negative electrode (see FIG. 2), a control switch 15 protruded from the periphery near the top, and an indicator light 151, for example, LED (light emitting diode) installed in the control switch 15 for power on/off indication. When switched on the control switch 15, the indicator light 151 is turned on, and the motor is started to rotate the speed reduction gear set and the spindle 13.

The battery lid 14 has a bottom hub 143. An illuminating light 16, for example, LED (light emitting diode) is installed in the bottom hub 143 of the battery lid 14. A smoothly arched reflector 144 is mounted inside the bottom hub 143 of the battery lid 14 around the illuminating light 16 for reflecting light from the illuminating light 16 toward the outside of the battery lid 14 for illumination when the user is holding or participating in a candlelight dinner or outdoor cooking at night.

The top side of the hollow shell 11 of the driving unit 1 is joined to the base 2, having a plurality of longitudinal coupling grooves 17 spaced around the periphery for the connection of respective longitudinally extending bottom coupling rods 21 of the base 2.

The base 2 is a top-open barrel fastened to the top side of the driving unit 1, having a plurality of bottom coupling rods 21 respectively plugged into the longitudinal coupling grooves 17 of the hollow shell 11 of the driving unit 1 and then affixed thereto with fastening members, for example, screws, an inside grinding chamber 22, which has a bottom center through hole (not shown) for the passing of the spindle 13, a ground powder outlet 23 at one side for guiding out the ground powder. The hollow shell 11 of the driving unit 1 further has two ribs 181 protruded from the periphery and extending along the length, defining a discharge trough 18, which is disposed in communication with the ground powder outlet 23 of the base 2 and has a bottom discharge opening 183 that has a width gradually reducing toward the bottom. The control switch 15 is located in the discharge trough 18. A water-drop-like guide member 182 is mounted in the discharge trough 18 around the control switch 15 for guiding the discharging ground powder away from the control switch 15 when the discharging ground powder goes through the discharge trough 18. The base 2 further has at least one inner thread 24, preferably one thick inner thread and two fine inner threads for foolproof and directional installation, and an engagement portion 25. As illustrated in FIG. 1, the engagement portion 25 is a one-way toothed ring.

Further, a conical distribution wheel 26 is affixed to the spindle 13 and suspending in the bottom side of the grinding chamber 22, having a plurality of radial ribs 261. After grinding of the loaded material into powder by the grinding device 3, the conical distribution wheel 26 collects the ground powder from the grinding device 3 during its rotary motion with the spindle 13, causing the radial ribs 261 to guide the ground powder out of the grinding chamber 22 of the base 2 through the ground powder outlet 23 toward the discharge trough 18. When the ground powder falls out of the ground powder outlet 23 into the discharge trough 18, it is discharged out of the discharge opening 183 due to the effect of gravity.

The grinding device 3 is comprised of a grinding disk 31 and a grinding base 32. The grinding base 32 is provided at the top side of the grinding disk 31. The grinding disk 31 is a conical disk having a center mounting hole 311 coupled to the spindle 13. After insertion of the spindle 13 through the center mounting hole 311 of the grinding disk 31, a cap 131 is capped on the top end of the spindle 13 to secure the grinding disk 31 firmly to the spindle 13. Further, the grinding disk 31 has a plurality of spiral wings 312 equiangularly spaced around the center mounting hole 311, a plurality of spiral grooves 313 equiangularly spaced around the center mounting hole 311 and separated from one another by the spiral wings 312 for guiding the loaded material, for example, spice outwardly downwards, and a plurality of ratchet teeth 314 arranged around the periphery for moving the loaded material relative to the grinding base 32.

The grinding base 32 is a circular, stepped, hollow member fixedly fastened to the rotary cap 44 of the container 4, having a bottom portion 321 of relatively greater outer diameter and a top body portion 322 of relatively smaller outer diameter. The top body portion 322 has a plurality of locating ribs 323 spaced around the periphery and fastened to the rotary cap 44 of the container 4 for synchronous rotation with the rotary cap 44, a plurality of oblique guide ribs 324 spaced around the upper part of its inside wall, and a plurality of fine grinding teeth 325 spaced around the lower part of its inside wall. The inner diameter of the top body portion 322 of the grinding base 32 is slightly smaller than the outer diameter of the grinding disk 31 so that the grinding disk 31 is prohibited from entering the grinding base 32 and a gas is constantly kept between the grinding disk 31 and the grinding base 32. When rotating the grinding disk 31, the loaded grain or strip-like material falls to the spiral grooves 313 among the spiral wings 312 and is carried by the spiral wings 312 and the spiral grooves 313 toward gaps in between the ratchet teeth 314 and the grinding teeth 325 for grinding into powder different particle sizes. Fine particle size powder immediately falls out of the grinding device 3. Powder having a particle size greater than the gap between of the grinding disk 31 and the grinding base 32 is continuously ground. According to the present preferred embodiment, the grinding disk 31 and the grinding base 32 are respectively made of acid-proof, wearing proof, anti-oxidation precision ceramics.

The container 4 is hollow, inverted cone mounted on the base 2 at the top. Preferably, the container 4 is transparent so that the user can visually check the amount of the loaded material to be ground. The container 4 has a bottom opening 411, an annular bottom coupling flange 41 extending around the bottom opening 411, and an annular step 412 protruded from its inside wall and extending around the bottom opening 411. An elastic member 42, for example, spring is supported on the annular step 412 inside the container 4. A guide disk 43 is supported on the elastic member 42 inside the container 4. The guide disk 43 has a top guide surface 432 curved inwards, a center opening 433 cut through the center of the inwardly curved top guide surface 432 for guiding the loaded material into the grinding device 3 for grinding, an annular bottom locating groove 431 for the positioning of the top end of the elastic member 42, an annular coupling flange 434 downwardly extending from the bottom side between the center opening 433 and the annular bottom locating groove 431 and coupled to the rotary cap 44. The rotary cap 44 has a bottom chamber 441, which receives the grinding base 32, a plurality of locating grooves 442 respectively forced into engagement with the locating ribs 323 of the grinding base 32 to secure the grinding base 32 to the bottom side of the rotary cap 44, an annular top coupling flange 445 abutted against the annular coupling flange 434 of the guide disk 43, an annular top coupling groove 443 extending around the annular top coupling flange 445 and coupled to the annular bottom coupling flange 41 of the container 4, a plurality of pins 446 upwardly extending from the annular top coupling flange 445 and respectively engaged into respective pinholes 435 on the bottom side of the annular coupling flange 434 of the guide disk 43. Fastening members, for example, screws may be fastened to the annular top coupling flange 445 of the rotary cap 44 and the annular coupling flange 434 of the guide disk 43 to affix the rotary cap 44 to the guide disk 43. The rotary cap 44 further has a plurality of positioning ribs 444 of different sizes for selectively engaging into respective positioning grooves 413 around the annular bottom coupling flange 41 of the container 4, and at least one outer thread 447 threaded into the at least one inner thread 24 of the base 2 such that the engagement portion 25 of the base 2 is forced into engagement with an engagement portion (toothed ring) 414 at the bottom side of the bottom coupling flange 41 of the container 4. After engagement between the engagement portion 25 of the base 2 and the engagement portion (toothed ring) 414 of the container 4, the container 4 is prohibited from rotation relative to the base 2 to adjust the gap between the grinding base 32 and the grinding disk 31.

Referring to FIGS. 1~3 again, the container 4 has particle size indication marks 415. By means of engagement between the at least one inner thread 24 and the at least one outer thread 447 and engagement between the positioning ribs 444 and the positioning grooves 413, the container 4 is joined to the base 2, and the gap between the grinding disk 31 and the grinding base 32 at this time is the maximum. At this time, the left particle size indication mark 415 is in alignment with the index 53 at the housing 5. Further, in order to close the container 4, a top cover 45 is covered on the top side of the container 4.

The housing 5 houses the driving unit 1 and the base 2 to cause a sense of beauty. The housing 5 has a longitudinal positioning rib 51 protruded from its inside wall and engaged into a longitudinal positioning groove 27 on the outside wall of the base 2, and a switch hole 52 cut through the periphery for receiving the control switch 15. The index 53 is marked on the outside wall of the housing 5 right above the switch hole 52.

Figure 4A:
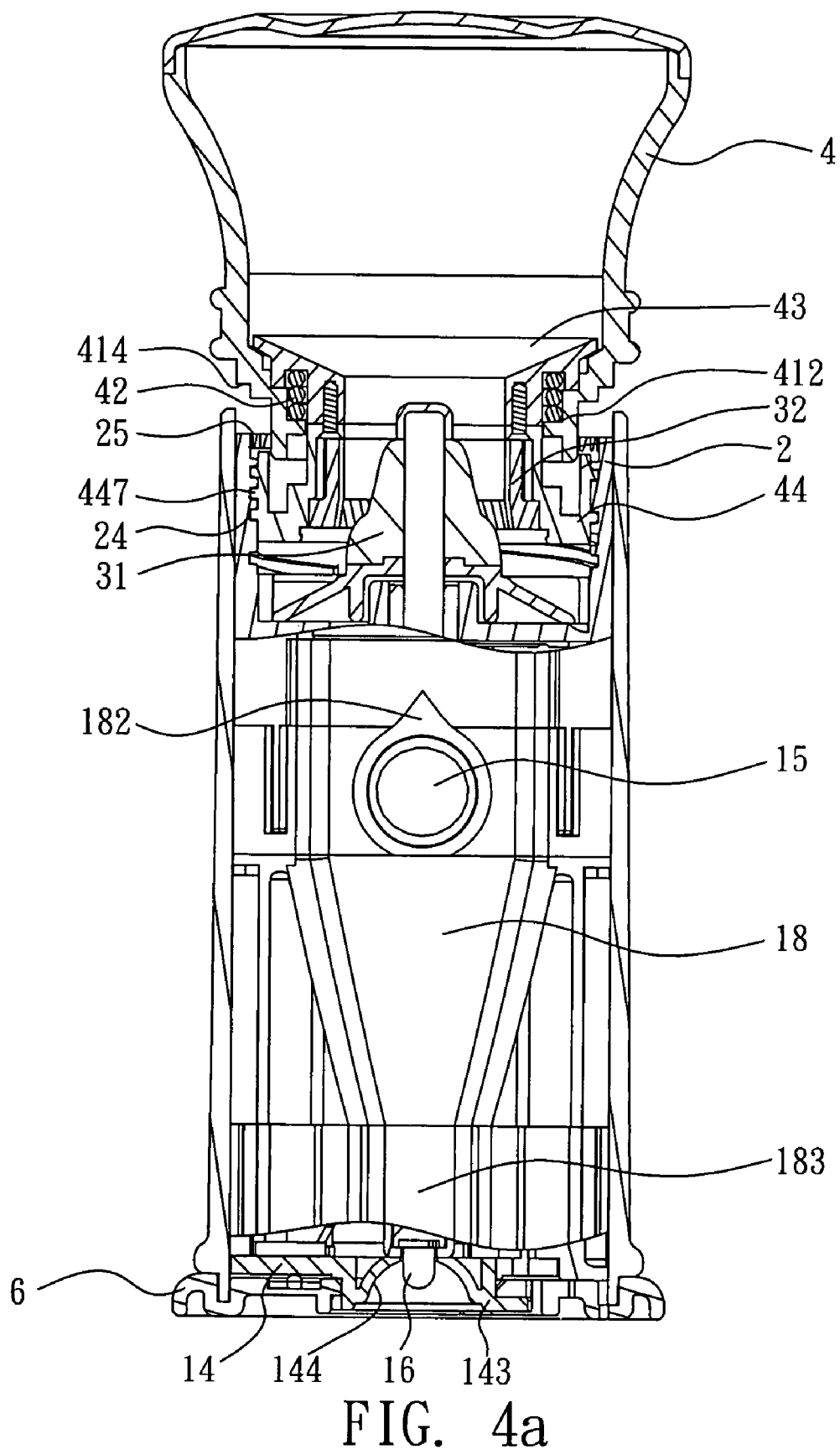
FIG. 4a is a sectional view of the present invention, showing the container lifted and disengaged from the base.
Figure 4B:
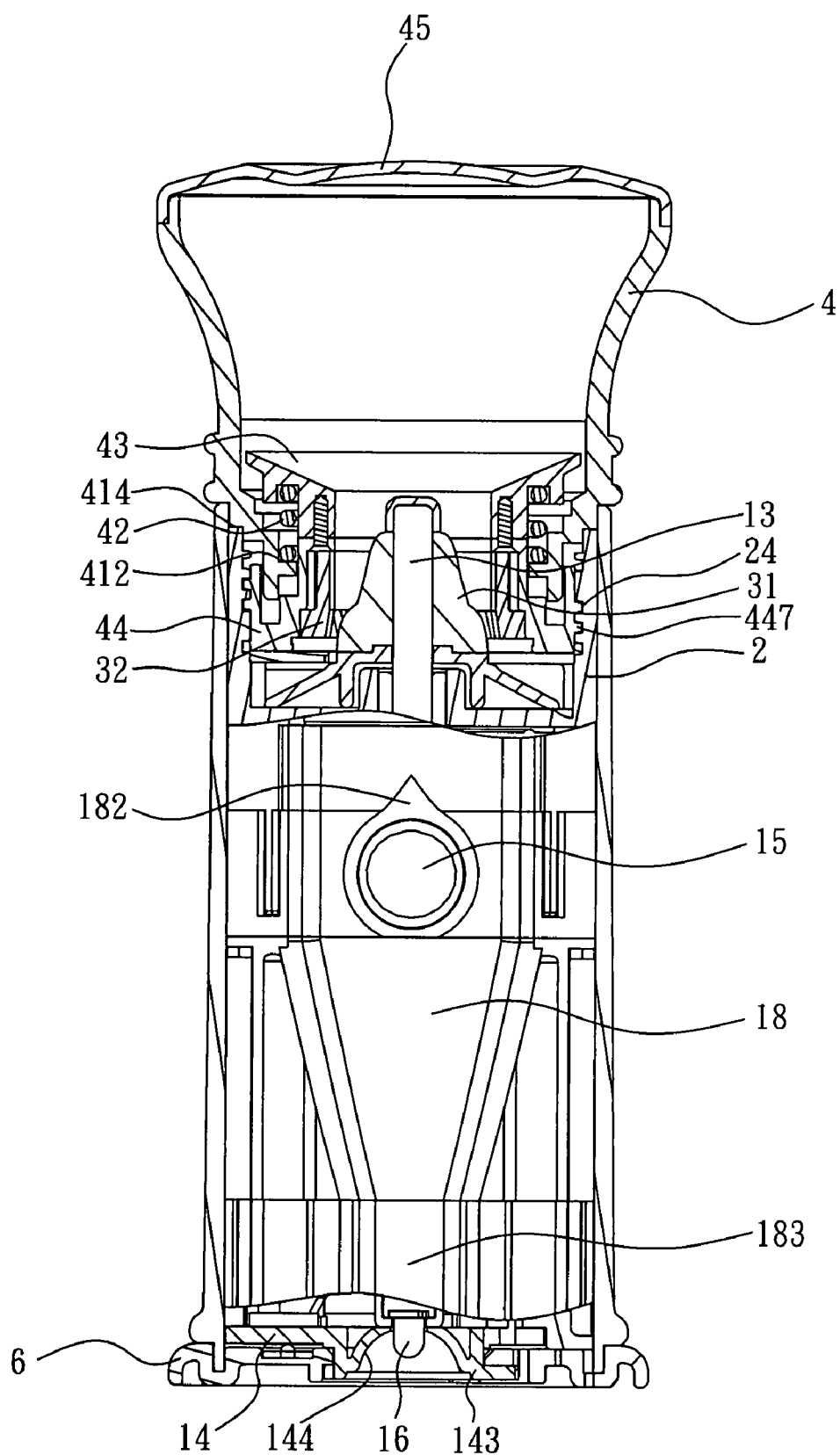
FIG. 4b is a sectional view of the present invention, showing the position of the container adjusted relative to the base.

Referring to FIGS. 4a and 4b, when adjusting the particle size of the ground powder, lift the container 4 relative to the housing 5. Because the rotary cap 44 is threaded into the base 2 and the guide disk 43 is joined to the rotary cap 44, the engagement portion (toothed ring) 414 of the bottom coupling flange 41 of the container 4 is disengaged from the engagement portion 25 of the base 2 and the step 412 is forced to compress the elastic member 42 against the guide disk 43 when lifted the container 4 relative to the housing 5. After disengagement of the engagement portion (toothed ring) 414 of the bottom coupling flange 41 of the container 4 from the engagement portion 25 of the base 2, the user can then rotate the rotary cap 44 relative to the base 2 to move the selected particle size indication mark 415 into alignment with the index 53. When the selected particle size indication mark 415 is in alignment with the index 53, release the hand from the container 4 for enabling the elastic member 42 to return to its former shape and to force the container 4 into engagement with the engagement portion 25 of the base 2 again. Thus, the ground powder particle size adjustment is done. According to the prior art design, the grinding disk is a movable member when adjusting the ground powder particle size. According to the present invention, the grinding base 32 of the grinding device 3 is a movable when adjusting the ground powder particle size. The grinding base 32 is fixedly fastened to the rotary cap 44 and movable with the rotary cap 44 relative to the grinding disk 31 to adjust the gap between the grinding disk 31 and the grinding base 32. After adjustment, the particle size of the ground powder is maintained at the desired level.

Figure 5A:
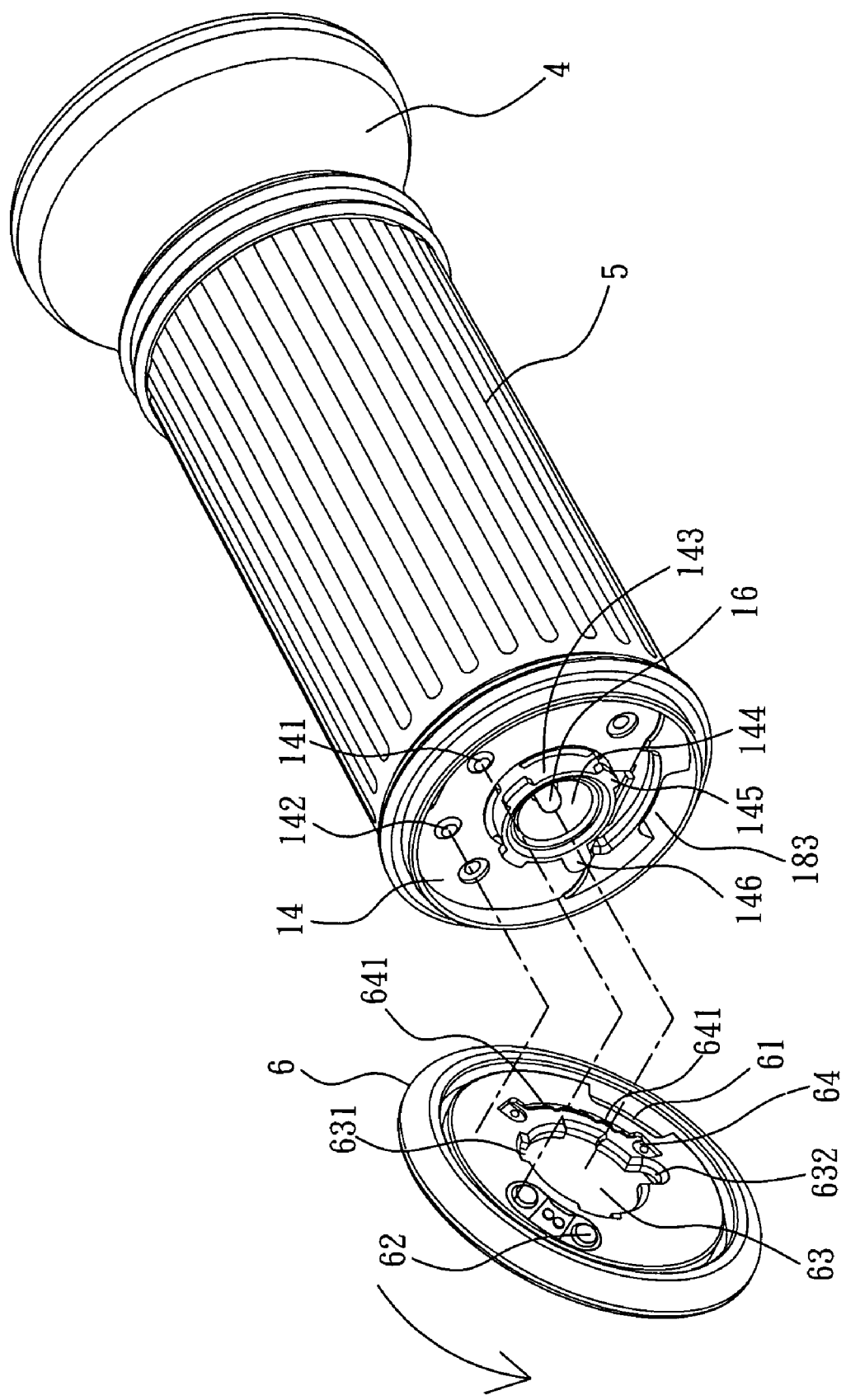
FIG. 5a is a schematic exploded view of the present invention, showing the relationship between the bottom cover and the battery lid (I).
Figure 5B:
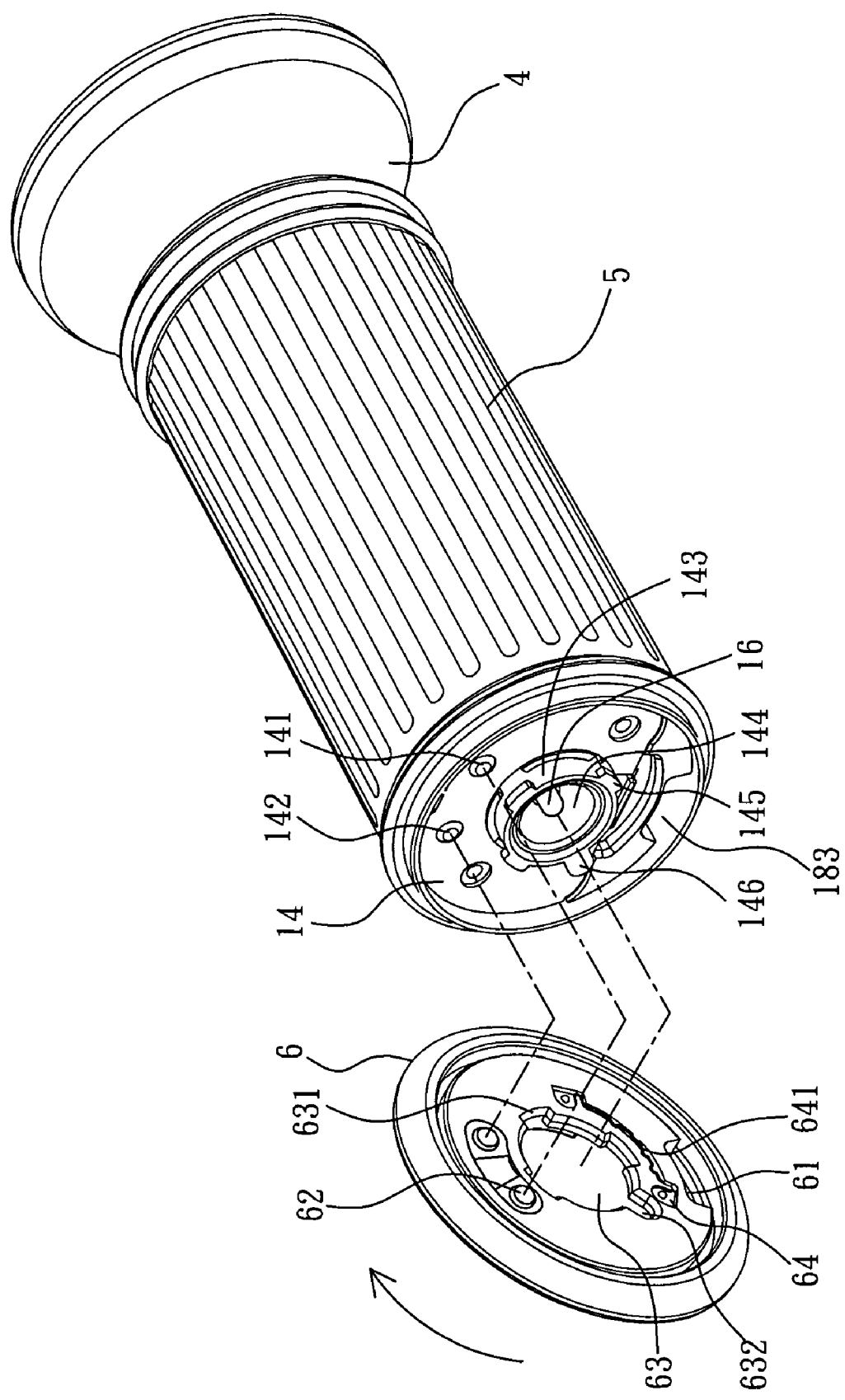
FIG. 5b is a schematic exploded view of the present invention, showing the relationship between the bottom cover and the battery lid (II).

Referring to FIGS. 5a and 5b, the bottom cover 6 is coupled to the bottom side of the driving unit 1, having a slot 61 corresponding to the discharge opening 183. When the slot 61 is in alignment with the discharge opening 183, the ground powder is discharged out of the discharge opening 183 and the slot 61. The bottom cover 6 can be rotated relative to the driving unit 1 to close the discharge opening 183. Further, the bottom cover 6 is provided with a metal connection plate 62. When the slot 61 is in alignment with the discharge opening 183, the metal connection plate 62 contacts the positive pole contact 141 and the negative pole contact 142 to close the battery power circuit. At this time, the indicator light 151 is turned on to give off light, and the grinder is in standby status. When switching on the control switch 15 (pressing the control switch and holding it in the pressed condition), the indicator light 151 is turned off, the driving unit 1 is started to rotate the grinding disk 31 relative to the grinding base 32, and at the same time the illumination light 16 is turned on to give off light for illumination.

Further, the battery lid 14 has at last one locating protrusion 145 and a long stop rod 146 respectively protruded from the periphery of the bottom hub 143. The bottom cover 6 has a center hole 63, at least one first notch 631 and a second notch 632 in communication with and spaced around the center hole 63, a sector sliding groove 64 in communication with the center hole 63 at one side, and a spring strip 641 fixedly mounted in the sector sliding groove 64. The spring strip 641 has multiple raised portions (not shown). After coupling of the bottom cover 6 to the bottom side of the driving unit 1, the bottom cover 6 can be rotated on the bottom hub 143 of the battery lid 14 to move the raised portions of the spring strip 641 over the stop rod 146, and therefore the user can sense the step of the rotation of the bottom cover 6 relative to the driving unit 1. When the stop rod 146 is stopped at one end of the sector sliding groove 64, the slot 61 is in alignment with the discharge opening 183, and the metal connection plate 62 is kept in contact with the positive pole contact 141 and the negative pole contact 142 to close the battery power circuit. When the stop rod 146 is stopped at the other end of the sector sliding groove 64, the stop rod 146 in alignment with the second notch 632 and the at last one locating protrusions 145 is in alignment with the at least one first notch 631, and the user can then remove the bottom cover 6 from the driving unit 1 for replacement of the battery cells.

As stated above, the invention changes the myth of the prior art design in which the driving unit must be disposed at the top side of the container. By means of altering the arrangement between parts of the grinding device and setting the grinding device between the container and the base, the invention allows lifting of the container to disengage the bottom engagement portion of the container from the top engagement portion of the base and also allows rotation of the container relative to the base to change the gap between the grinding base and the grinding disk after disengagement of the container from the base, i.e., the invention allows easy adjustment of the ground powder particle size. The ground powder is guided out of the base and discharged out of the discharge trough of the driving unit. Further, the invention provides an illumination light and an indicator light for illumination during grinding and for operation status indication. Further, the grinder is provided with a bottom cover that prohibits external bodies from entering the driving unit. When the slot of the bottom cover is in alignment with the discharge opening of the discharge trough, the metal contact plate is kept in contact with the positive pole contact and the negative pole contact to close the power circuit and to turn on the indicator light, i.e., the grinder enters the standby mode.

Although a particular embodiment of the invention has been described in detail for purposes of illustration, various modifications and enhancements may be made without departing from the spirit and scope of the invention.

What is claimed is:

1. A grinder comprising:
   a spindle;
   a hollow base having a grinding chamber for accommodating said spindle, a ground powder outlet in communication with said grinding chamber, at least one inner thread extending around the inner side of said grinding chamber, and a top engagement portion;
   a grinding device, said grinding device comprising a grinding disk and a grinding base, said grinding disk being affixed to said spindle and suspending in said grinding chamber and kept spaced from said grinding base by a gap;
   a container mounted on a top of said hollow base, said container comprising a bottom opening, an annular bottom coupling flange extending around said bottom opening, an engagement portion extending from said annular bottom coupling flange for engaging the top engagement portion of said hollow base to prohibit rotation of said container relative to said hollow base, a hollow guide disk mounted therein and spaced above said bottom opening, an elastic member supported between said annular bottom coupling flange and said hollow guide disk, and a rotary cap rotatably coupled to said annular bottom coupling flange and fastened to said hollow guide disk, said rotary cap having a bottom side fixedly connected to said grinding base and at least one outer thread threaded into the at least one inner thread of said hollow base;
   wherein when lifting said container to disengage the engagement portion of said annular bottom coupling flange from the top engagement portion of said hollow base, said elastic member is compressed by said annular bottom coupling flange against said hollow guide disk, and said rotary cap is rotatable with said container relative to said hollow base to adjust the gap between said grinding base and said grinding disk.

2. The grinder as claimed in claim 1, further comprising a driving unit, said driving unit mounted on a bottom of said hollow base, a bottom battery chamber holding a set of battery cells in a bottom side of said driving unit, a battery lid covering said battery chamber, a motor mounted in a top side thereof, and a speed reduction gear coupled between said motor and a bottom end of said spindle and rotatable by said motor to rotate said spindle.

3. The grinder as claimed in claim 2, wherein said driving unit comprises a shell, a control switch outwardly protruding from the periphery of said shell at one side, and an indicator light mounted in said control switch.

4. The grinder as claimed in claim 2, wherein said driving unit comprises a bottom hub, an illumination light mounted in said bottom hub, and a reflector mounted in said bottom hub around said illumination light.

5. The grinder as claimed in claim 2, wherein said driving unit comprises a shell, said shell having two longitudinal ribs, a discharge trough defined between said two longitudinal ribs in communication with said ground powder outlet of said hollow base, said discharge trough having a width gradually reducing downwards and terminating in a discharge opening.

6. The grinder as claimed in claim 1, wherein the at least one inner thread of said hollow base comprises a thick inner thread and at least one fine inner thread; the at least one outer thread of said rotary cap comprises a thick outer thread and at least one fine outer thread.

7. The grinder as claimed in claim 1, wherein the top engagement portion of said hollow base is a one-way toothed ring; the engagement portion of said container is a one-way toothed ring for engaging the one-way toothed ring of said hollow base.

8. The grinder as claimed in claim 1, further comprising a conical distribution disk fixedly mounted on said spindle and suspending in a bottom side of said grinding chamber of said hollow base.

9. The grinder as claimed in claim 1, wherein said grinding disk has a center mounting hole fastened to said spindle; said spindle has a top end fitted into the center mounting hole of said grinding disk and capped with a cap.

10. The grinder as claimed in claim 1, wherein said container has an inside annular step extending around an inside wall of said bottom annular coupling flange; said hollow guide disk has an annular bottom locating groove; said elastic member has a bottom end supported on said inside annular step of said container and a top end engaged into the annular bottom locating groove of said hollow guide disk.

11. The grinder as claimed in claim 1, wherein said hollow guide disk has a top guide surface curved inwards, a center opening cut through the center of said top guide surface, an annular bottom locating groove for holding said elastic member, an annular coupling flange downwardly extending from a bottom side thereof between the center opening and annular bottom locating groove of said hollow guide disk and coupled to said rotary cap; said rotary cap has a bottom chamber, which receives said grinding base, and an annular top coupling flange fastened to the annular coupling flange of said guide disk to constrain said elastic member to the space between said hollow guide disk and said container.

12. The grinder as claimed in claim 11, wherein said rotary cap has a plurality of pins; said hollow guide disk has a plurality of pinholes respectively fastened to the pins of said rotary cap.

13. The grinder as claimed in claim 1, wherein said rotary cap has an annular top coupling groove coupled to the annular bottom coupling flange of said container, and a plurality of positioning ribs for selectively engaging into respective positioning grooves around the annular bottom coupling flange of said container.

14. The grinder as claimed in claim 1, wherein said container has a top open side covered with a top cover.

15. The grinder as claimed in claim 1, further comprising a housing surrounding said hollow base and a driving unit, said housing comprising a switch hole for receiving a control switch of said driving unit, an index for aiming at one of a set of ground powder particle size indication marks at said container.

16. The grinder as claimed in claim 2, further comprising a bottom cover rotatably coupled to a bottom side of said driving unit, said bottom cover having a slot movable with said bottom cover relative to said driving unit to close/open the discharge opening, a metal contact plate, which is moved into contact with positive and negative metal contacts of said driving unit to close a power circuit of said driving unit when said slot is in communication with said discharge opening.

17. The grinder as claimed in claim 16, wherein said driving unit comprises a bottom hub, at last one locating protrusion and a long stop rod respectively protruded from the periphery of said bottom hub; said bottom cover has a center hole for receiving said bottom hub, at least one first notch and a second notch disposed in communication with and spaced around the center hole of said bottom cover corresponding to said at least one locating protrusion and said stop rod, and a sector sliding groove disposed in communication with the center hole of said bottom cover at one side and coupled to the long stop rod of said driving unit; said bottom cover is rotatable relative to said driving unit between a first position where said long stop rod of said driving unit is stopped at one end of said sector sliding groove and said slot of said bottom cover is in communication with said discharge opening, and a second position where the at least one first notch and a second notch of said bottom cover are respectively in alignment with the at last one locating protrusion and long stop rod of said driving unit for allowing removal of said bottom cover from said driving unit.

18. The grinder as claimed in claim 17, wherein said bottom cover further comprises a spring strip fixedly mounted in said sector sliding groove, said spring strip having a plurality of raised portions that are moved over the long stop rod of said driving unit when said bottom cover is rotated relative to said driving unit.

* * * * *